Dec. 13, 1966 P. C. CLARKE 3,291,474
HEAT-SENSITIVE, NON-CUMULATIVE FORCE SPIRAL
SPRING AND SPRING MOTOR
Filed Oct. 14, 1964 2 Sheets-Sheet 1
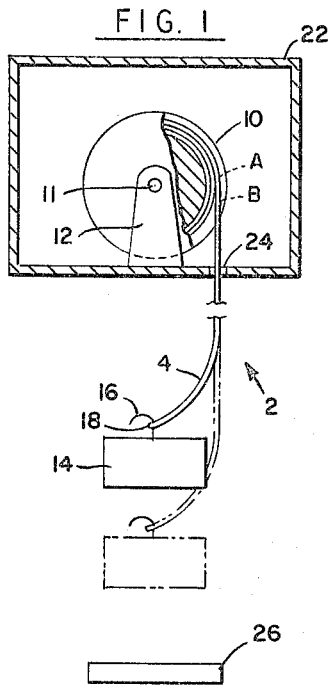
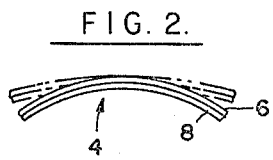
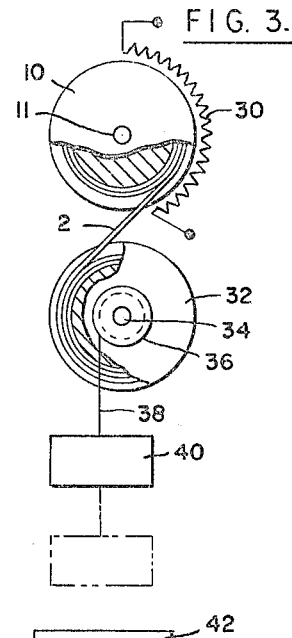
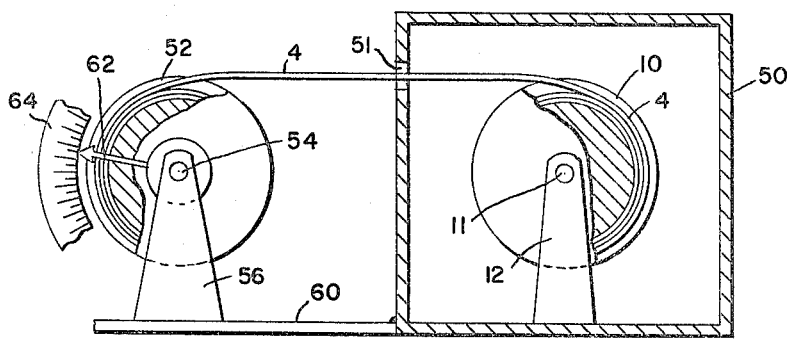
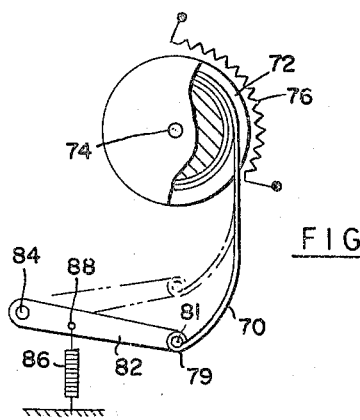
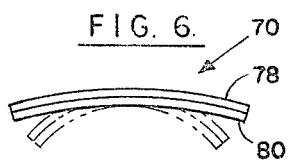
INVENTOR.
PHILIP C. CLARKE
BY
ATTORNEYS Dec. 13, 1966   P. C. CLARKE   3,291,474
HEAT-SENSITIVE, NON-CUMULATIVE FORCE SPIRAL
SPRING AND SPRING MOTOR
Filed Oct. 14, 1964   2 Sheets-Sheet 2

*INVENTOR.*
PHILIP C. CLARKE
BY

ATTORNEYS

United States Patent Office 3,291,474
Patented Dec. 13, 1966

3,291,474
HEAT-SENSITIVE, NON-CUMULATIVE FORCE SPIRAL SPRING AND SPRING MOTOR
Philip C. Clarke, Lansdale, Pa., assignor to Ametek, Inc., New York, N.Y., a corporation of Delaware
Filed Oct. 14, 1964, Ser. No. 403,795
11 Claims. (Cl. 267—1)

This invention relates to a heat-sensitive, non-cumulative force spiral spring and also relates to a motor incorporating such a spring.

Non-cumulative force spiral springs are well-known to the art being disclosed, for example, in Lermont Patent No. 2,609,192 and Foster Patent No. 2,609,191. Such springs are widely used commercially being sold by the Hunter Spring Division of Ametek, Inc., under its trademark "NEG'ATOR." These springs are known to have a wide variety of uses, particularly in various types of spring motors where they are of particular advantage due to their low gradient and exceptionally long run (see for example Cook Patent 2,647,743). While these heretofore known springs exert a varying force with temperature variations, the force variation due to temperature is insignificant for most applications and insufficient for any practically useful application.

In accordance with this invention there is provided a heat-sensitive, non-cumulative force spiral spring of great utility by forming a non-cumulative force spring from a thermometal strip of spring metal.

The use of a thermometal strip in a non-cumulative force spring produces a new and highly useful operating characteristic. Forms of thermometal units commonly used all have the same basic operating characteristic. Deflection of the unrestrained end is substantially linearly proportional to the temperature change and these deflections are of relatively small order. By using a thermometal non-cumulative force spring and constructing either an extension or B-motor an entirely different action obtains. Assume a bimetallic non-cumulative force spring to be in a system which is in a state of neutral equilibrium. If now the temperature of the spring is changed, the thermometal will change its initial curvature resulting in a change in the spring force. Since the system will no longer be in equilibrium, it will begin to move and will continue to move until stopped by external restraining means. Very substantial deflections up to several feet can be obtained in this manner. Direction of motion of the system depends on which side the high expansion side of the thermometal has been coiled in the spring. By slightly altering the precurvature of the spring along its length so as to obtain a slightly positive or negative force deflection characteristic, the motion of the system can be made proportional to the temperature change. In any event, instead of the limited motion of the ordinary bimetal forms, large deflections are obtainable.

The spring of the invention is formed of thermosensitive laminated metal. Such metals which are conventionally used are resilient providing good spring characteristics and as used herein, the term "thermosensitive laminated metal" is intended to include only a resilient product having spring characteristics such as resilient thermostat metal (ASTM). Reference may be had to "Fundamental of Thermostat Metals," by R. M. Sears, in Materials-Research and Standards, December 1963, Volume 3, Number 12, the contents of which is incorporated herein by reference.

While generally the laminated metals will have only two laminations advantageously of equal thickness, the well-known thermosensitive laminated metals having three, four or more laminations may be employed.

In accordance with this invention such springs are formed by taking a strip of the desired thermosensitive laminated metal and setting, preferably mechanically, each increment of its length to a predetermined radius so that each coil of the spring will be in close contact with its adjacent coil. The method of forming the spring of this invention other than the selection of the thermosensitive laminated metal strip may be the same as that disclosed in Lermont Patent No. 3,007,239, issued November 7, 1961, and hence need not be further detailed here. It is satisfactory for most practical purposes to set the metal strip so that each increment thereof is set to the same radius. However, the radii of the increments may be varied to provide a resultant variation in the spring gradient as may be desirable or necessary for the particular application involved.

Any of the conventionally used thermosensitive laminated metals such as resilient thermostat metals can be employed to form the spring of this invention. Since, generally, it is desired to have high strength, it will generally be preferable to have the lamination of high strength materials such as stainless steel. Exemplary of a metal having a low co-efficient of thermal expansion is one having the following composition: 36% to 64% nickel with the balance iron which includes Invar. Further exemplary is one containing 55½% to 61% cobalt, 8% to 10½% chromium and the balance iron. A chromium-iron alloy such as 17% chromium with the balance iron is satisfactory. Exemplary of metals having a high thermal co-efficient of expansion are nickel-chromium-iron alloys of the following compositions:

(1) 18% chromium, 8% nickel, balance iron
(2) 3% chromium, 22% nickel, balance iron
(3) 11.5% chromium, 18% nickel, balance iron Further exemplary of suitable metals having a high co-efficient of thermal expansion are brass as well as silicon-copper alloys such as 0.5% to 5% silicon with the balance copper.

A wide range of suitable resilient bimetals are well known to the art and readily available commercially. Reference may be had to Patent 2,770,870 and the patents cited therein, the disclosures of which are incorporated herein by reference.

The force exerted by the spring of this invention will vary substantially with variations in temperature. Where it is desired that the spring in accordance with this invention exert a reduced force when subjected to a higher temperature or an increased force when subjected to a lower temperature, the high co-efficient of expansion side will be on the inside of the spring strip, i.e. the side closest to the center of the spring when coiled and the side having the low co-efficient of expansion will be on the outside of the spring. When the reverse result is desired, the situation will be reversed with the high side being on the outside of the spring strip and the low side being on the inside of the spring strip.

The invention will be further clarified by reading of the following description in conjunction with the drawings in which:

FIGURE 1 is a diagrammatic view of a spring in accordance with the invention in an extension motor application;

FIGURE 2 is an enlarged section taken on the plane indicated by the line 2—2 in FIGURE 1;

FIGURE 3 is a diagrammatic view of a spring in accordance with the invention incorporated in an alternative motor embodiment;

FIGURE 4 is a diagrammatic view of the spring of the invention incorporated in an alternative motor embodiment;

FIGURE 5 is a diagrammatic view of a spring of the invention incorporated in an extension motor embodiment;

FIGURE 6 is a horizontal section taken on the plane indicated by the line 6—6 in FIGURE 5 and enlarged;

Figure 7:
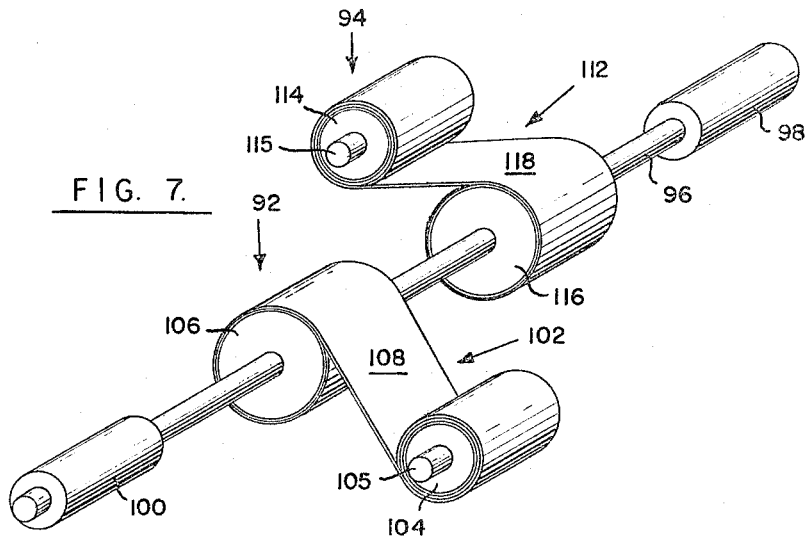
FIGURE 7 is a perspective diagrammatic view of springs of the invention incorporated in an alternative embodiment.

Referring now to FIGURES 1 and 2, a spring 2 in accordance with this invention is formed from a strip 4 which has an outer lamination 6 of a metal having a low co-efficient of thermal expansion and an inner lamination 8 of a metal having a high co-efficient of thermal expansion. Strip 4 is mechanically set so that each increment is set to a constant radius and the adjacent coils are in close contact, i.e., when the spring is fully coiled, it forms a solid spiral. The inner portion of spring 4 is coiled on a drum 10 which is mounted for free rotation on a shaft 11 supported by a standard 12.

As with a conventional non-cumulative force spiral spring, the spring 2 has a force zone which exerts the total force exerted by the spring and which is that portion of the strip 4 which is being straightened from its coiled position on drum 10 to its extended position. This force zone lies approximately between the dotted lines A and B. It will be appreciated from a study of FIGURES 1 and 2 that if the temperature of spring 2 is changed, the force which it exerts will likewise be changed. Thus, if the temperature of spring 2 is raised from room temperature of say 70° F. to 80° F., the natural radius of curvature of the spring will be increased (but not sufficiently to give the innermost coil a natural radius larger than the radius of drum 10) due to the greater expansion of lamination 8 as contrasted to lamination 6, as illustrated in phantom in a section of spring 2 shown in FIGURE 2. This naturally will result in requiring less force to straighten the strip 4 in the force zone lying between lines A and B in FIGURE 1. Similarly, it will be appreciated that if the temperature of spring 2 were lowered from room temperature to, for example, 50° F., the reverse would be true since lamination 8 will contract more than lamination 6 resulting in a decreased natural radius of each increment of strip 4. Hence, at 40° F. it would require a greater force to straighten strip 4 as it passes through the force zone.

FIGURE 1 is also illustrative of a motor in accordance with this invention. A freely movable counterbalancing weight 14 has secured thereto a hook 16 which engages the free end 18 of spring 2. Drum 10 and its associated structure is contained within a duct 22 with the spring strip 4 passing downwardly through a narrow opening 24 in the duct. The thus described system is in equilibrium at, for example, 70° F. Assuming now that a hot gas is introduced into duct 22 and heats the strip 4 contained within duct 22 to a temperature of for example, 80° F., the natural radius of the spring at this temperature will be increased which in turn will decrease the force which strip 4 exerts in the force zone. This will result in destroying the equilibrium between the motor and weight 14 permitting the weight to lower uncoiling strip 4 from drum 10 until weight 14 is arrested by stop member 26. By the same token, had the temperature of the gas in duct 22 lowered the temperature of spring 2 to say 60° F., the force exerted by the spring would have been increased and the weight would have been raised. It is evident that this structure is highly responsive to small changes in temperature and can, contrary to heretofore known bimetallic elements, exert a very large deflection or movement responsive to temperature change. The force exerted can readily be employed to do very useful work and is of great value where a large deflection is desired such as in a window sash balance device.

In FIGURE 3, spring 2 is shown in an alternative structure. Here again, spring 2 is mounted on a storage drum 10 which is freely rotatable on shaft 11. A heating coil 30 is provided to heat the portion of spring 2 coiled on drum 10 when desired. The portion of spring 2 led off drum 10 is backwound onto an output drum indicated at 32 which rotates with shaft 34. Such a motor configuration with the heretofore known types of non-cumulative force spiral springs is known as a B-motor and is disclosed in Fornelius Patent No. 1,977,546, issued October 16, 1934. A pulley 36 is fixedly secured to shaft 34 and has partially wound thereon a cable 38 which has its free end connected to a weight 40. In this modification the force zone of the spring includes the force zone described in connection with FIGURE 1 and additionally extends to the point where the spring is backwound to the radius to which it is wound on drum 32. This results in a substantial increase in the force exerted by the spring. Assuming the motor and weight to be equilibrium, the weight can be lowered until it hits stop 42 by energizing heating coil 30 and heating spring 2 to increase the natural radius. Weight 40 will lower until it is arrested by stops 42.

Referring now to FIGURE 4, the spring 2 of FIGURES 1 and 2 is mounted employing the drum 10, shaft 11 and standard 12 shown in FIGURE 1. Standard 12 is mounted within a conduit 50 which has an opening 51 through which strip 4 passes. In lieu of employing a counterbalancing weight as in FIGURE 1, the free end of strip 4 is coiled on a drum 52 which is identical with drum 10. Drum 52 is secured to shaft 54 which is mounted for rotation in a standard 56 (see Cook Patent 2,647,743). Standard 56 is mounted on a platform 60 attached to conduit 50 as by welding. Assuming the temperature within conduit 50 to be the same as the temperature exterior of the casing, it is evident that the force exerted by spring 2 in the force zones adjacent drums 10 and 52 will be substantially equal. If the temperature within conduit 50 is raised, the natural radius of the spring material in the force zone adjacent drum 10 will be increased due to the thermosensitive metal of the spring causing a reduced force to be exerted. Since the force exerted in the force zone adjacent drum 52 remains unchanged, the strip 4 will uncoil from drum 10 and coil up on drum 52. If the distance between the two drums is sufficiently great to permit substantial cooling of strip 4 as it passes from drum 10 to drum 52, all of the strip will uncoil from drum 10 to drum 52. It is equally apparent that if the temperature within duct 50 is below the outside temperature, winding up in the reverse direction will occur. A position indicating pointer 62 secured to shaft 54 and scale 64 are also included.

Referring now to FIGURE 6, a bimetallic spring 70 is formed from an outer lamination 78 having a high co-efficient of expansion and an inner lamination 80 of a metal having a low co-efficient of thermal expansion. Spring 70 is set so that each increment is set to a constant radius with the adjacent coils in close contact. Referring to FIGURE 5, spring 70 is mounted on a drum 72 mounted for free rotation on a shaft 74. A heating coil 76 is positioned adjacent drum 72. The looped free end 79 of spring 70 engages a pin 81 on a lever 82 which is pivoted at 84. An extension coil spring 86 attached to lever 82 at 88 biases lever 82 downwardly to counterbalance the force exerted by spring 70. When heat is applied by heating coil 76, the natural radius of spring 70 is reduced as illustrated in phantom lines in FIGURE 6. This causes spring 70 to exert an increased force which will cause spring 70 to move lever 82 upwardly about pivot 84 until the force exerted by spring 70 is counter-balanced by the increased force exerted by spring 86. Similarly, if heating coil 76 is inactivated, the force exerted by spring 70 will be reduced permitting spring 86 to restore lever 82 to its original position.

An alternative employment of the invention is illustrated in FIGURE 7 where a pair of opposed B-motors 92 and 94 are connected to a shaft 96 rotatably mounted in bearings 98 and 100. B-motor 92 has a bimetallic non-cumulative force spring 102 mounted on a storage drum 104 which is mounted for free rotation on a shaft 105. The portion of spring 102 led off drum 104 is back-wound onto power drum 106 which is fixedly secured to shaft 96. The high expansion side 108 of spring 102 faces away from drum 106.

B-motor 94 has a bimetallic non-cumulative force spring 112 wound on storage drum 114 which is mounted for free rotation on shaft 115. The portion of spring 112 which is led off from storage drum 114 is backwound onto power drum 116 which is fixedly secured to shaft 96. The low expansion side 118 of spring 112 faces away from drum 116.

Figure 8:
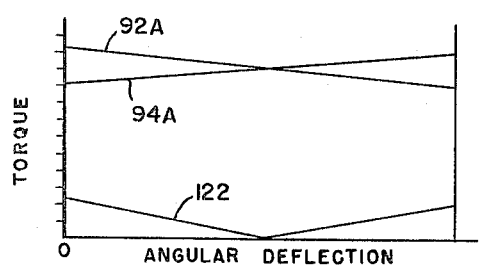
FIGURE 8 is a diagram representing the gradients of the spring motors employed in FIGURE 7.
Figure 9:
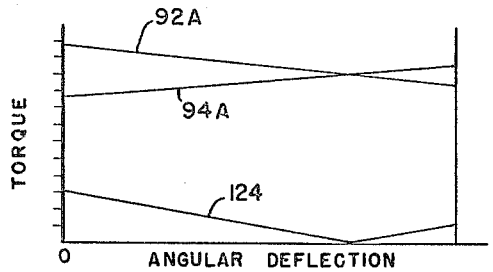
FIGURE 9 is a diagram representing the gradients employed in FIGURE 7 after a variation in temperature.

Thus, as shown in FIGURE 7, B-motors 92 and 94 tend to rotate shaft 96 in opposite directions, B-motor 92 tending to rotate it clockwise as viewed in FIGURE 7 and B-motor 94 tending to rotate it counterclockwise. Assuming that springs 102 and 112 have been set to a constant radius, B-motors 92 and 94 will each have a slight positive gradient due to the change in the numbers of wraps of the springs on the drums. Assuming the angular deflection to be zero when spring 112 is fully wound onto storage drum 114, the torque versus deflection of B-motor 92 is shown by line 92A in FIGURE 8, that of B-motor 94 by line 94A and the net torque by line 122. Where these lines intersect, the system shown in FIGURE 7 is at equilibrium. Assuming now that the system is subjected to heating and that hence springs 102 and 112 are heated, the natural radius of spring 102 will be decreased and hence its torque versus deflection line 92A will move upwardly to the position shown in FIGURE 9. Correspondingly, the natural radius of spring 112 will increase and hence the torque versus deflection line 94A will move downwardly as illustrated in FIGURE 9. This results in a net torque shown by line 124 and in shifting the intersection of lines 92A and 94A to the right as viewed in FIGURE 9 indicating that shaft 96 will have been rotated clockwise as viewed in FIGURE 7 to restore the torque balance. With such a system, small changes of temperature can be employed to produce a large number of turns of shaft 96. It will be obvious that a similar result can be achieved with the embodiment of FIGURE 4 by employing separate springs coiled on drums 10 and 52 with one of the springs having its high expansion side facing away from its drum and the other spring with its low expansion side facing away from its drum and the outer ends of the springs secured together.

What is claimed is:

1. A heat-sensitive, non-cumulative force spiral spring comprising a length of thermosensitive laminated metal set to form a plurality of tightly wound convolutions with successive convolutions in contact in which the length of metal has an inner and an outer lamination with one lamination having a higher coefficient of thermal expansion than the other lamination.

2. A spring in accordance with claim 1 in which the outer lamination has the higher co-efficient of thermal expansion.

3. A spring in accordance with claim 1 in which the inner lamination has the higher co-efficient of thermal expansion.

4. A spring device comprising a noncumulative force spiral spring comprising a length of thermosensitive laminated metal set to form a plurality of tightly wound convolutions with successive convolutions in contact and means supporting said spring for rotation about its axis in which the length of metal has an inner and an outer lamination with one lamination having a higher co-efficient of thermal expansion than the other lamination.

5. A device in accordance with claim 4 in which the outer lamination has the higher co-efficient of thermal expansion.

6. A device in accordance with claim 4 in which the inner lamination has the higher co-efficient of thermal expansion.

7. A spring device comprising an output drum, a storage drum and a tightly coiled noncumulative force ribbon spring connecting said drums and tending to uncoil from the output drum and to coil onto the storage drum, said ribbon spring comprising a length of thermosensitive laminated metal set to form at rest a plurality of tightly wound convolutions with successive convolutions in contact in which the length of metal has an inner and an outer lamination with one lamination having a higher co-efficient of thermal expansion than the other lamination.

8. A spring device in accordance with claim 7 in which the outer lamination has the higher co-efficient of thermal expansion.

9. A spring device in accordance with claim 8 in which the inner lamination has the higher co-efficient of thermal expansion.

10. A spring device comprising a pair of spaced drums having parallel axes and substantially the same diameter, a non-cumulative force ribbon spring having one end coiled on one of said drums and the other end coiled on the other of said drums, said spring comprising a length of thermosensitive laminated metal set to form at rest a plurality of tightly wound convolutions with successive convolutions in contact in which the length of metal has an inner and an outer lamination with one lamination having a higher co-efficient of thermal expansion than the other lamination.

11. A spring device comprising output means, a pair of heat sensitive, non-cumulative, force spiral springs each comprising a length of thermosensitive laminated metal set to form at rest a plurality of tightly wound convolutions with successive convolutions in contact, means to connect said springs to said output means with the springs urging the output means in opposite directions in which the length of metal in each spring has an inner and outer lamination with the outer lamination of one spring having a higher co-efficient of thermal expansion than the inner lamiation and the outer lamination of the other spring having a lower co-efficient of thermal expansion than the inner lamination.

References Cited by the Examiner
UNITED STATES PATENTS

| | | | |
|---|---|---|---|
| 1,386,834 | 8/1921 | Beckert | 267—1 |
| 1,881,997 | 10/1932 | Broune | 267—1 |
| 1,977,458 | 10/1934 | Stargardter | 267—1 |
| 2,622,700 | 12/1952 | Geyer | 185—37 |
| 2,899,193 | 8/1959 | Foster | 207—1 |
| 2,911,063 | 11/1959 | Wolfson | 185—37 |
| 3,151,704 | 10/1964 | Clarke | 185—37 |
| 3,216,528 | 11/1965 | Lohr | 185—37 |

ARTHUR L. LA POINT, *Primary Examiner.*

R. M. WOHLFARTH, *Assistant Examiner.*